April 18, 1933.  W. C. LAUGHLIN ET AL  1,904,062
DISCHARGE APPARATUS
Filed Dec. 13, 1929    2 Sheets-Sheet 2
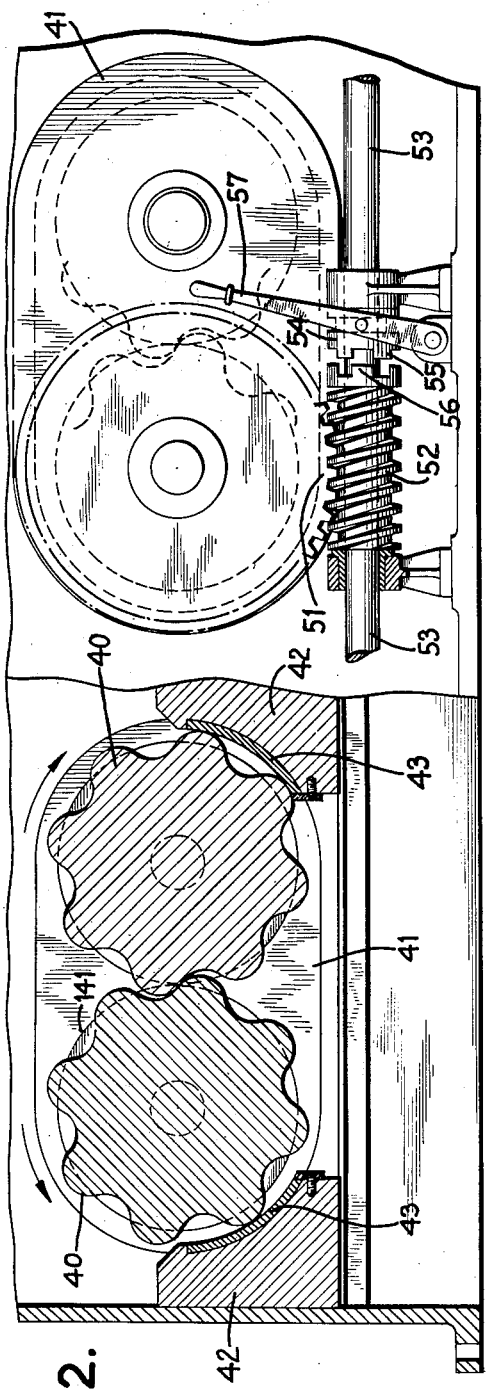
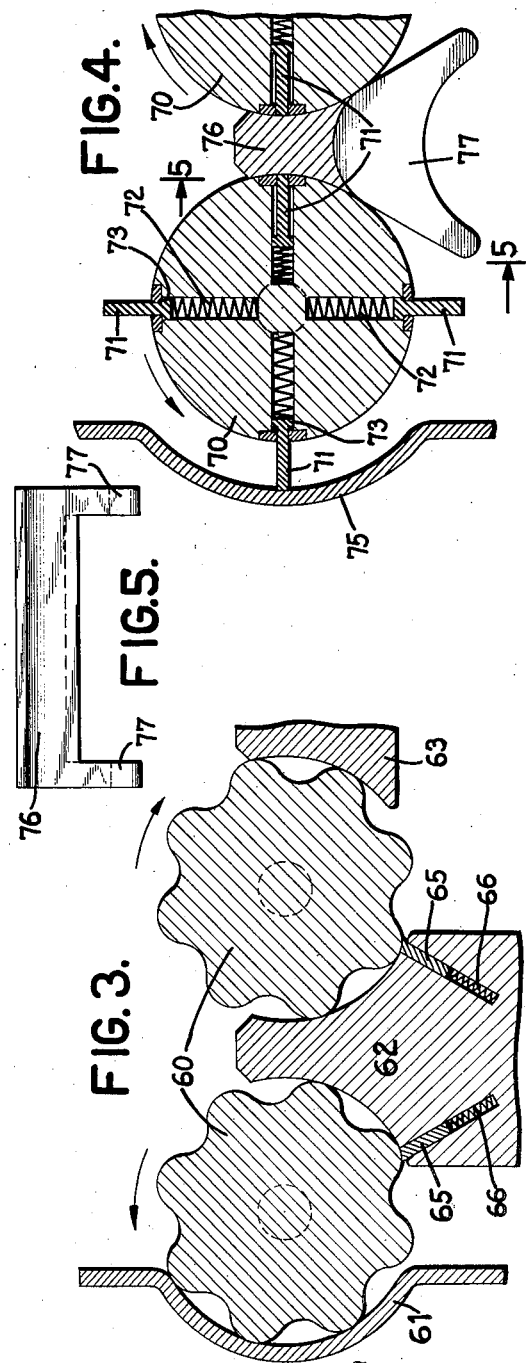

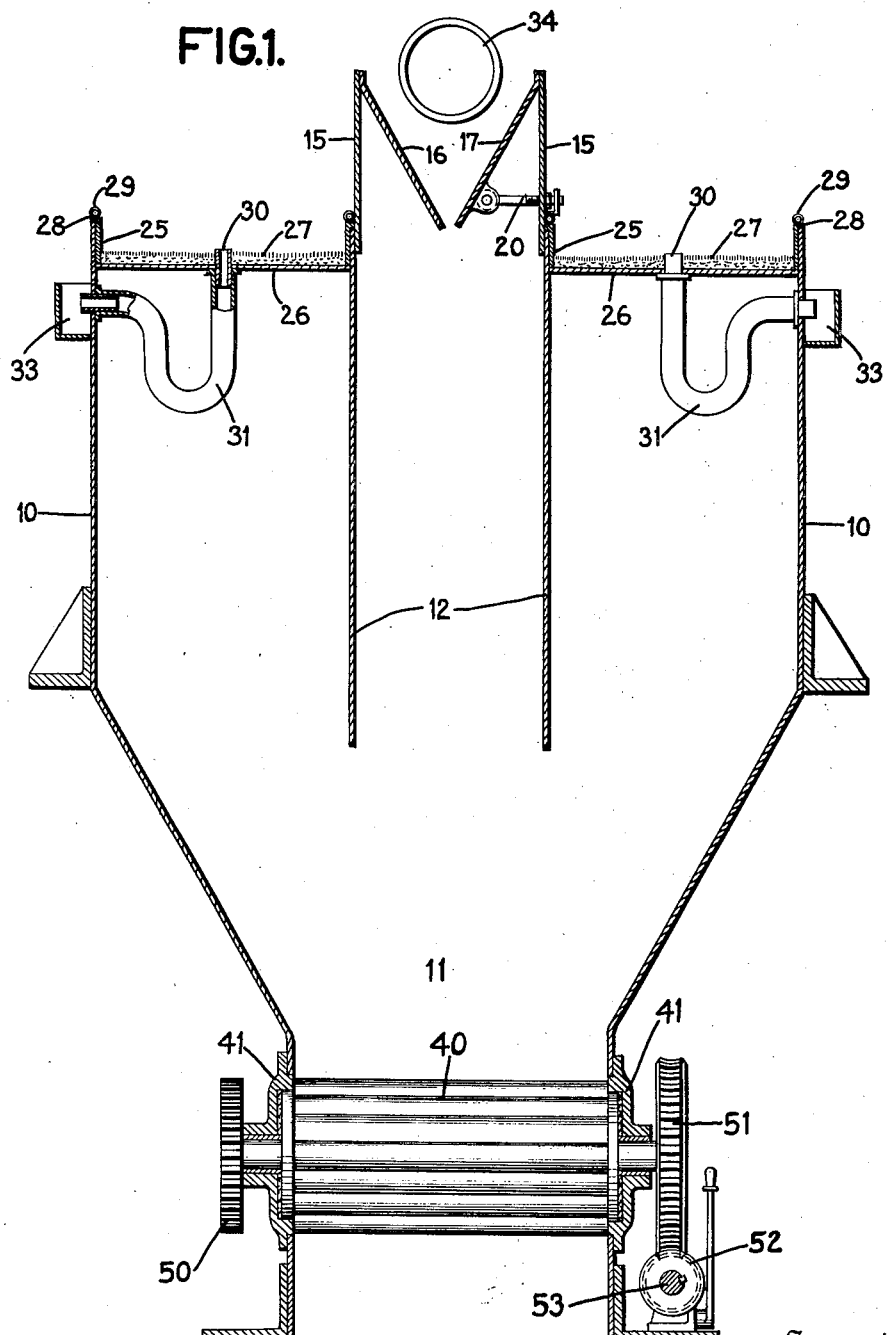

Patented Apr. 18, 1933

1,904,062

UNITED STATES PATENT OFFICE

WILLIAM C. LAUGHLIN, OF GLENDALE, CALIFORNIA, AND ABRAHAM B. ASCH, OF NEW YORK, N. Y., ASSIGNORS TO THE L. A. B. COMPANY, OF NEW YORK, N. Y., A CORPORATION OF NEW YORK

DISCHARGE APPARATUS

Application filed December 13, 1929. Serial No. 413,794.

This invention relates to thickeners or clarifiers for removing fine suspended matter from a liquid, and more particularly to a new and improved discharge apparatus therefor.

The invention relates specifically to a discharge apparatus for use with a clarifier in which fine suspended matter is removed from a liquid and settles to the bottom. The discharge apparatus is capable of removing the suspended matter from the clarifier tank at a predetermined rate while preventing any substantial discharge of liquid. The apparatus also permits the rate of discharge to be varied under different parts of the clarifier tank.

The invention provides a relatively simple, dependable, highly efficient and convenient device of the type above indicated.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a transverse section of the clarifier showing the location of the discharge apparatus;

Fig. 2 is a side elevation of the discharge apparatus partly broken away to show the discharge rollers in section;

Figs. 3 and 4 are transverse sections of modified forms of the discharge apparatus; and Fig. 5 is a side elevation of the base block.

Like reference characters denote like parts in the several figures of the drawings.

In the following description and in the claims parts will be identified by specific names for convenience, but they are intended to be as generic in their application to similar parts as the art will permit.

Referring to the drawings more in detail the invention is shown as applied to a clarifier tank having side walls 10, sludge hopper 11 and longitudinally extending baffle plates 12 which project downwardly from the surface of the tank toward the sludge hopper.

The supply launder is mounted on frame sections 15 which are secured to baffles 12. The launder includes a stationary side 16 and movable side 17 by means of which the discharge opening may be controlled. The adjusting screw 20 may be associated with movable side 17 and threaded through frame 15 to permit adjustment of side 17 thereby varying the opening between sides 16 and 17 and the rate of discharge of material from the launder to the clarifier tank.

A plurality of clarifier baskets 25 are mounted on the sides of the launder between baffles 12 and walls 10 of the tank. These baskets have perforated bottoms 26 which may be formed of any desired material, such as wire screen or bars. Said bottoms are adapted to support the clarifier medium 27 and prevent discharge of said medium therethrough, while freely permitting upward flow of the liquid under treatment. Baskets 25 may be provided with flanges 28 which extend over baffles 12 and sides 16 for supporting the baskets in operative position at the top of the tank. Eyes 29 are secured in flanges 28 to receive the elevating means by which the baskets may be raised out of contact with the liquid.

A discharge nozzle 30 is secured in the bottom of each basket 25 and is connected by flexible pipe 31 to an overflow weir 33 which is supported on the outside of walls 10. Inlet pipe 34 terminates adjacent the launder for supplying thereto the liquid to be treated.

The discharge apparatus comprises a plurality of rollers 40 which are rotatably mounted in frame 41 secured to the sides of the launder beneath sludge hopper 11. Said rollers are mounted with their axes extending across the clarifier tank and are grouped in pairs which are separately controlled for discharge purposes as will be described. Each roller is provided with a fluted surface which extends above and below a theoretical base line 141. A portion of the surface which extends above said base line preferably takes the form of an epicycloid and the portion below the base line the form of a hypocycloid. The surfaces thus formed are capable of maintaining a line contact between the two rollers as they are rotated in unison in opposite directions, for example, in the direction indicated by the arrows in Fig. 2.

Each pair of rollers contacts with base blocks 42 which are mounted in the bottom of the sludge hopper and form a seal to prevent material from passing therethrough. Contacting strips 43 of any suitable material may be inserted in the face of base blocks 42 to provide a surface which may be removed and renewed to compensate for wear. Each pair of rollers is provided with a pair of spur gears 50 which causes the two rollers of the pair to be driven in opposite directions and at the same speed whereby the fluted surfaces are maintained in their desired line contact. A worm wheel 51 is mounted on the shaft of one of said rollers of each pair and is driven by a cooperating worm gear 52 which is loosely mounted on driving shaft 53.

For connecting and disconnecting worm gear 52 from shaft 53 a clutch is provided comprising a collar 54 which is keyed to said shaft and carries teeth 55 which cooperate with teeth 56 formed in the end of said worm gear. Hand lever 57 is pinned to collar 54 and provides means for controlling the position thereof with respect to said worm gear. It is to be understood that a separate driving gear and clutch is provided for each pair of rollers, so that the various rollers along the clarifier tank may be operated as desired.

In the operation of the above described device the material under treatment is supplied to the launder through pipe 34 at a rate which is regulated with respect to the rate of discharge from the launder to always maintain a given amount of liquid therein. The rate of discharge from the launder is regulated by controlling the size of opening between sides 16 and 17 whereby the liquid containing fine suspended matter is caused to travel downwardly between baffles 12, to pass under said baffles and to rise between baffles 12 and sides 10. The liquid then passes upwardly through baskets 25 and the clarifier medium contained therein and discharges through pipe 31 into weir 33.

The rate of flow of the liquid is maintained such that the coarser particles gradually settle into the sludge hopper and the finer particles coagulate across the bottom of the screen, building up in size until they are sufficiently heavy to drop off and settle into the sludge hopper. The settled material is removed by causing rotation of rollers 40 at a slow rate of speed, as for example, one revolution in ten minutes.

Said rollers are rotated as shown by the arrows in Fig. 2, so that their outer surfaces move downwardly and their inner contacting surfaces move upwardly. The outer fluted surfaces accordingly cause a certain amount of settled material to be carried past base blocks 42 and to be discharged from the hopper. The line contact between the surfaces of adjacent rollers prevents the material from passing downwardly between the rollers or air from entering the tank. The admission of air is undesirable as it disturbs or stirs up the material and retards settling of sludge. The sludge which may adhere to the surfaces of the rollers is squeezed out as it approaches the point of mutual contact and falls back into the discharge chamber.

The device accordingly forms a substantially tight discharge valve which is capable of removing the sludge at a predetermined rate and at the same time preventing discharge of the liquid. If desired, means may be provided for closing the space under any pair of rollers when that pair of rollers is taken out of operation for any reason. Furthermore, a flexible drive may be employed if required to maintain the surfaces of adjacent rollers in intimate contact and suitable scraping means (not shown) may be employed for removing material which may adhere to the surface of the rollers before the point of mutual contact is reached.

In the modified form of the invention shown in Fig. 3 a pair of rollers 60, provided with fluted surfaces, are mounted for rotation between end plate 61 of a sludge hopper and base blocks 62 and 63. When the rollers are rotated in the direction of the arrows the material is discharged around the outer surfaces of the rollers, whereas the surfaces contacting with base blocks 62 prevent leakage of material between the two rollers. For removing material which may adhere to the surface of the rollers before contacting with base block 62 a pair of scrapers 65 may be provided which are mounted in suitable grooves in base blocks 62 and pressed by springs 66 into engagement with said surface. These scrapers also prevent air from going into the tank at that point after the fluted portions are emptied of the material.

In the modification shown in Fig. 4 the rollers 70 are provided with scrapers 71 which are mounted in suitable slots in said rollers and pressed outwardly by springs 72. Shoulders 73 formed on said scrapers prevent said scrapers from being entirely removed from said rollers. In the operation of this form of invention scrapers 71 are adapted to contact with sides 75 of the sludge hopper as the rollers are rotated thereby discharging the material caught between two successive scrapers. Leakage is prevented around the other side of the roller by base blocks 76 which are provided at their ends with flanges 77 adapted to contact with scrapers 71 as the rollers are rotated and force said scrapers into retracted position thereby preventing material from being caught between the scrapers and block 76.

The discharge apparatus has been described as applied to a particular type of clarifier. It is obvious, however, that it may be applied to various other types and the invention is not to be limited to the specific embodiment which has been disclosed. The mechanism provides for the efficient discharge of the sludge from a sludge hopper while at the same time preventing substantial leakage of the liquid therefrom. By employing a plurality of pairs of rollers located along the bottom of the sludge hopper, each pair of which may be selectively connected to the driving shaft, it is obvious that the rate of discharge may be controlled in accordance with the sludge formation in the various parts of the hopper whereby efficient operation of the clarifier may be maintained. While a single roller may be employed in certain instances it is generally preferable to utilize a pair of rollers to prevent air from entering the tank as sludge is discharged. With a single roller the scrapers may be used to perform a similar function as well as to remove sludge particles from the rollers.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a clarifier tank, a sludge hopper having a discharge opening, a discharge mechanism for said hopper comprising a roller having an axially fluted surface mounted in said discharge opening, and means for normally preventing discharge of material through said opening, comprising members engaging the raised portions of said fluted surface and forming, in conjunction with said surface, a complete closure for said discharge opening, the depressed portions of said fluted surface being adapted to pick up material from said hopper and to carry the same past one of said closure members when said discharge mechanism is rotated, and means for preventing passage of material or air between said roller and the other of said members comprising a member making continuous contact with said fluted surface when said roller is rotated, whereby entrance of material or air into said hopper is prevented.

2. In a clarifier tank, a sludge hopper having a discharge opening, a pair of rollers mounted in said opening for rotation about a horizontal axis, said rollers having intermeshed axially fluted surfaces, means for rotating said rollers in opposite directions while maintaining said fluted surfaces in contact whereby passage of material between said rollers is prevented, closure members engaging the raised portions of said fluted surfaces and in conjunction therewith forming a complete closure for said opening, the depressed portions of said fluted surfaces serving to pick up material and carry the same past said closure members when said rollers are rotated, said contacting surfaces operating to squeeze out material which has adhered to said rollers and prevent passage of said material between said rollers, and prevent entrance of air into said hopper.

3. In a clarifier tank, a hopper having a discharge opening, a pair of rollers having axially fluted surfaces comprising epicycloids and hypocycloids, said rollers being mounted in said opening with said surfaces intermeshed, means for rotating said rollers in opposite directions while maintaining said fluted surfaces in contact whereby passage of material therebetween is prevented, closure means carried by said hopper and forming in connection with said rollers a complete closure for said discharge opening, the depressed portions of said fluted surfaces serving to carry material past said closure means and discharge the same when said rollers are rotated.

4. In a clarifier tank, a sludge hopper having a discharge opening and closure means for said opening comprising a roller mounted in said opening, members located on each side of said roller, means whereby a permanent closure is effected between said roller and one of said members for preventing passage of material or air therebetween and means whereby material is passed between said roller and the other of said members when said roller is rotated.

5. In a clarifier tank, a sludge hopper having a discharge opening and closure means for said opening comprising a roller mounted therein, said roller having a fluted surface, stationary members secured on each side of said roller and contacting with the raised portions of said surface to form, in conjunction with said roller, a complete closure for said opening and a scraper carried by one of said stationary members and resiliently held in engagement with said fluted surfaces as said roller is rotated, said scraper serving to dislodge material which has adhered to said surface and to prevent entrance of air into the said hopper as said roller is rotated.

6. In a clarifier tank, a sludge hopper having a discharge opening and closure means for said opening comprising a roller mounted therein, stationary members mounted on opposite sides of said roller, flanges carried by said roller and adapted to contact with said members, one of said members being spaced from the surface of said roller whereby said flanges are extended and serving to carry material past said member when said roller is rotated, the other of said members being in contact with the surface of said roller to form a permanent closure and prevent passage of material into said hopper.

7. In a clarifier tank, a sludge hopper having a discharge opening and closure means for said opening comprising a roller mounted therein, stationary members mounted on opposite sides of said roller, flanges carried by said roller and adapted to contact with said members, one of said members being spaced from the surface of said roller whereby said flanges are extended and serving to carry material past said member when said roller is rotated, the other of said members being in contact with the surface of said roller to form a permanent closure and prevent passage of material into said hopper, and means carried by said last mentioned stationary member for depressing said flanges and preventing material from being carried into said hopper thereby.

In testimony whereof we have hereunto set our hands.

WILLIAM C. LAUGHLIN.
ABRAHAM B. ASCH.